United States Patent
Sathyanarayana et al.

(10) Patent No.: US 11,519,882 B2
(45) Date of Patent: *Dec. 6, 2022

(54) ULTRASONIC TRANSDUCER SYSTEM AND METHOD FOR BI-MODAL SYSTEM RESPONSES

(71) Applicant: Texas Instruments Incorporated, Dallas, TX (US)

(72) Inventors: Amardeep Sathyanarayana, Austin, TX (US); David P. Magee, Allen, TX (US); Anand G. Dabak, Plano, TX (US); Srinath M. Ramaswamy, Murphy, TX (US)

(73) Assignee: TEXAS INSTRUMENTS INCORPORATED, Dallas, TX (US)

(*) Notice: Subject to any disclaimer, the term of this patent is extended or adjusted under 35 U.S.C. 154(b) by 165 days.

This patent is subject to a terminal disclaimer.

(21) Appl. No.: 17/020,884

(22) Filed: Sep. 15, 2020

(65) Prior Publication Data
US 2020/0408725 A1 Dec. 31, 2020

Related U.S. Application Data

(63) Continuation of application No. 15/236,666, filed on Aug. 15, 2016, now Pat. No. 10,809,235.
(Continued)

(51) Int. Cl.
*G01N 29/34* (2006.01)
*G01F 1/667* (2022.01)
(Continued)

(52) U.S. Cl.
CPC .......... *G01N 29/348* (2013.01); *G01F 1/662* (2013.01); *G01F 1/667* (2013.01); *G01F 25/10* (2022.01);
(Continued)

(58) Field of Classification Search
CPC ..... B06B 1/0215; B06B 1/0223; G01F 1/662; G01F 1/667; G01F 25/10;
(Continued)

(56) References Cited

U.S. PATENT DOCUMENTS

| 3,568,142 A | 3/1971 | Landrum, Jr. |
| 4,265,125 A | 5/1981 | Mahany |

(Continued)

FOREIGN PATENT DOCUMENTS

| CN | 102378094 A | 3/2012 |
| CN | 103490754 A | 1/2014 |
| WO | WO2014121403 A1 | 8/2014 |

OTHER PUBLICATIONS

State Intellectual Property Office of PRC; Notification of First Office Action and Search Report; dated Jul. 3, 2019; 6 pages.
(Continued)

*Primary Examiner* — David L Singer
(74) *Attorney, Agent, or Firm* — Krista Y. Chan; Charles A. Brill; Frank D. Cimino

(57) ABSTRACT

A transducer system. The system comprises a transducer and circuitry for applying an excitation waveform to excite the transducer during an excitation period. The circuitry for applying has: (i) circuitry for applying a first waveform at a first frequency; and (ii) circuitry for applying a second waveform at a second frequency differing from the first frequency.

27 Claims, 8 Drawing Sheets

Related U.S. Application Data

(60) Provisional application No. 62/244,422, filed on Oct. 21, 2015.

(51) Int. Cl.

| | | |
|---|---|---|
| *G01N 29/30* | (2006.01) | |
| *G01N 29/50* | (2006.01) | |
| *G01N 29/44* | (2006.01) | |
| *G01N 29/12* | (2006.01) | |
| *G01N 29/11* | (2006.01) | |
| *G01F 1/66* | (2022.01) | |
| *G01F 25/10* | (2022.01) | |
| *G01N 29/36* | (2006.01) | |
| *G01P 5/24* | (2006.01) | |
| *G01N 29/024* | (2006.01) | |
| *G01N 29/32* | (2006.01) | |

(52) U.S. Cl.
CPC ............. *G01N 29/11* (2013.01); *G01N 29/12* (2013.01); *G01N 29/30* (2013.01); *G01N 29/343* (2013.01); *G01N 29/345* (2013.01); *G01N 29/346* (2013.01); *G01N 29/36* (2013.01); *G01N 29/4454* (2013.01); *G01N 29/50* (2013.01); *G01N 29/024* (2013.01); *G01N 29/326* (2013.01); *G01N 2291/011* (2013.01); *G01N 2291/014* (2013.01); *G01N 2291/02836* (2013.01); *G01N 2291/044* (2013.01); *G01P 5/245* (2013.01)

(58) Field of Classification Search
CPC ....... G01N 2291/011; G01N 2291/014; G01N 2291/02836; G01N 2291/044; G01N 29/024; G01N 29/11; G01N 29/12; G01N 29/30; G01N 29/326; G01N 29/343; G01N 29/345; G01N 29/346; G01N 29/348; G01N 29/36; G01N 29/4454; G01N 29/50; G01P 5/245
See application file for complete search history.

(56) References Cited

U.S. PATENT DOCUMENTS

| | | |
|---|---|---|
| 4,308,754 A | 1/1982 | Pedersen |
| 4,372,168 A | 2/1983 | Watson |
| 5,117,698 A | 6/1992 | Baumoel |
| 2005/0124882 A1 | 6/2005 | Ladabaum et al. |
| 2005/0288873 A1 | 12/2005 | Urdaneta |
| 2012/0062286 A1 | 3/2012 | Ginsberg |
| 2012/0261579 A1 | 10/2012 | Ramaswamy |
| 2013/0205913 A1 | 8/2013 | Lykke |
| 2014/0111366 A1 | 4/2014 | Ginsberg |
| 2014/0318268 A1 | 10/2014 | Sorensen |
| 2015/0377017 A1* | 12/2015 | McRory ............... B06B 1/0215 367/82 |
| 2016/0334255 A1 | 11/2016 | Gestner |

OTHER PUBLICATIONS

Gracey & Associates, Acoustic Glossary, term "Tone" (Year: 2014).
The American Heritage dictionary, term "continuous wave" (Year: 2020).
Wayne Storr, Electrical Waveforms and Electrical Signals, Basic Electronics Tutorials Site (Year: 2014).
Free Online Encyclopedia, term "pusle train" (Year:2015).
Sloet et al, GERG Project on Ultrasonic Gas Flow Meters, Phase II, 2000, Groupe Europeen de Recherches Gazieres, (Year 2000).

* cited by examiner

ULTRASONIC TRANSDUCER SYSTEM AND METHOD FOR BI-MODAL SYSTEM RESPONSES

CROSS-REFERENCES TO RELATED APPLICATIONS

This application is a continuation of U.S. patent application Ser. No. 15/236,666, filed on Aug. 15, 2016, which claims priority to, the benefit of the filing date of, and hereby incorporates herein by reference, U.S. Provisional Patent Application 62/244,422, entitled "TWO TONE EXCITATION OF ULTRASONIC TRANSDUCERS ACROSS WIDE TEMPERATURE RANGE UNDER HEAVILY ATTENUATED PROPAGATION MEDIUM IN ULTRASONIC BASED FLOW METROLOGY," and filed Oct. 21, 2015.

STATEMENT REGARDING FEDERALLY SPONSORED RESEARCH OR DEVELOPMENT

Not Applicable.

BACKGROUND OF THE INVENTION

The preferred embodiments relate to ultrasonic transducers and more particularly to a system and method using two tone excitation pulse frequencies for such transducers.

Ultrasound transducers are known in the art for transmitting ultrasound waves and detecting a reflection or echo of the transmitted wave. Such devices are also sometimes referred to as ultrasound or ultrasonic transducers or transceivers. Ultrasound transducers have myriad uses, including water and gas flow meters, consumer devices, vehicle safety, and medical diagnostics. In these and other fields, signals detected by the transducer may be processed to determine distance, which may be further combined with directional or area processing to determine flow, volume, shape, as well as aspects in connection with two and three dimensional processing, including image processing.

Flow meters (e.g., water or gas) are implemented in various schemes in the prior art, including mechanical, electromagnetic, and ultrasonics. The prior art for such meters includes a system having two ultrasonic transducers oriented to communicate signals between one another, with the signal traversing a channel inside a pipe. Generally an applied pulse (or series of pulses) excites a first of the two transducers, which generates a waveform that is received by a second of the transducers, after a certain amount of time which is measured as a first time-of-flight (TOF). The process is then reversed, whereby a pulse or pulses is applied to the second transducer, causing a waveform to be received by the first transducer, with a second TOF measured in this reversed process. The first and second TOF, and the differential TOF, determine speed of flow of the propagation medium between the transducers (and hence, along the medium in which the transducers are located). For precision purposes, however, accuracy in determining TOF may be of utmost importance, while at the same time balancing efficiency considerations in achieving a desirable accuracy is also typically an important consideration.

Accurately measuring TOF relies on numerous factors, including a sufficiently energized and detected waveform in each of the two directions during the TOF measures. Toward this end, it is known in the art that the transducer system has a resonant frequency, and accuracy is improved by exciting the transducer system near or at this resonant frequency, which is typically within a fairly narrow bandwidth. A key difficulty arises, however, in that the resonant frequency may be unknown or changing. For example, the system resonant frequency can become altered based on propagation medium temperature, impurities or composition, sedimentation, deposition or aging of the transducers, and transducer variability as between different manufacturers or even from the same manufacturer. Moreover, once the flow meter is deployed in the field, it becomes increasing difficult to constantly monitor these changes and adjust the excitation pulse frequency. Further, setting a static excitation frequency for each individual system during initial manufacture may be cost-prohibitive and not necessarily reliable once the system is deployed in the field, after which the system resonant frequency can temporarily or permanently change, in which case a static factory setting may no longer optimally generate a resonant echo and accurate TOF determination.

Given the preceding discussion, the present inventors seek to improve upon the prior art, as further detailed below.

BRIEF SUMMARY OF THE INVENTION

In a preferred embodiment, there is a transducer system. The system comprises a transducer and circuitry for applying an excitation waveform to excite the transducer during an excitation period. The circuitry for applying comprises: (i) circuitry for applying a first waveform at a first frequency; and (ii) circuitry for applying a second waveform at a second frequency differing from the first frequency.

Numerous other inventive aspects are also disclosed and claimed.

DETAILED DESCRIPTION OF EMBODIMENTS

Figure 1:
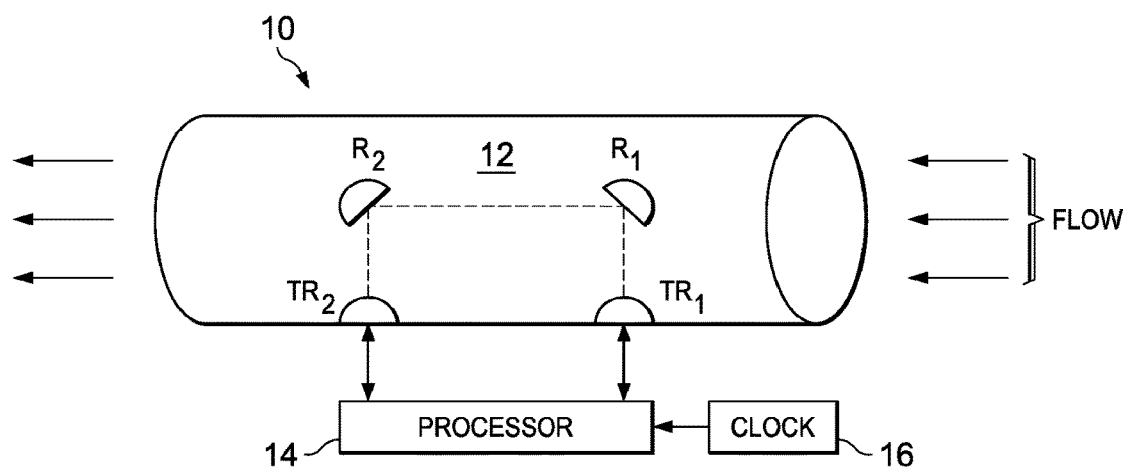
FIG. 1 illustrates a diagram of a flow meter transducer system.

FIG. 1 illustrates a diagram of a flow meter transducer system 10. System 10 as described in this initial paragraph is known in the art, but it also is included and improved upon in connection with the preferred embodiments as detailed hereafter. System 10 includes a pipe 12 through which a material, such as water or gas, may flow, and for sake of reference in FIG. 1 the flow direction is shown from right to left. Within pipe 12 are located a first transducer $TR_1$ and a second transducer $TR_2$. Proximate transducer $TR_1$ is a reflector $R_1$, and proximate transducer $TR_2$ is a reflector $R_2$. Each reflector $R_x$ is oriented so as to communicate a signal with its respective proximate transducer $TR_x$ and also to communicate a signal to the other reflector. As shown by a dashed line inside pipe 12 in FIG. 1, therefore, transducer $TR_1$ communicates a signal to reflector $R_1$, which reflects that signal to reflector $R_2$, which reflects that signal to transducer $TR_2$. Likewise, transducer $TR_2$ communicates a signal to reflector $R_2$, which reflects that signal to reflector $R_1$, which reflects that signal to transducer $TR_1$. Lastly, a processor 14, such as a digital signal processor, microprocessor, microcontroller, or some other electronic circuitry, receives a clock signal from a clock 16, and processor 14 is coupled to both transducer $TR_1$ and transducer $TR_2$ for exciting either transducer $TR_x$ to transmit a signal and to process a correspondingly received signal by the other transducer, as further explored below. Clock 16 is typically a low-power (e.g., power consumption ~140 μA/MHz) crystal oscillator with speeds in the range of 1-24 MHz.

Figure 2:
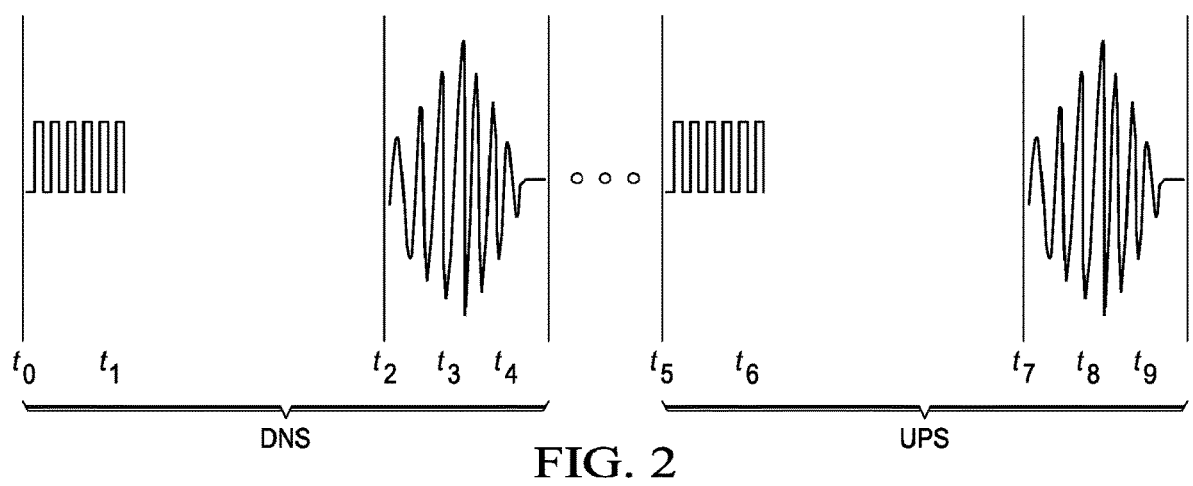
FIG. 2 illustrates a sequence diagram of the excitation and response waveforms of the flow meter transducer system of FIG. 1.

FIG. 2 illustrates a sequence diagram of the flow meter transducer system 10 of FIG. 1, where the sequence as illustrated and first described is also known in the art, but it also is included and improved upon in connection with the preferred embodiments as detailed hereafter. In general, FIG. 2 represents a first transmission in a first direction from first transducer $TR_1$ to second transducer $TR_2$, followed by a second transmission in second direction, opposite the first, from second transducer $TR_2$ to first transducer $TR_1$. For sake of reference, the first direction is shown and referred to as downstream (DNS) in the context of pipe 12 in FIG. 1, and the second direction is shown and referred to as upstream (UPS) in the context of pipe 12 in FIG. 1.

Looking at the DNS timeline, at a time $t_0$, processor 14, either directly or via additional circuitry (not shown), applies an excitation pulse train to transducer $TR_1$ which in response transmits a corresponding ultrasonic pulse train signal, where both the applied and transmitted pulse trains consist of a number of pulses, such as 10 to 40 such pulses, shown beginning therefore at time $t_0$ and ending at time $t_1$. The transmitted pulses are directed to reflector $R_1$, which reflects them to reflector $R_2$, toward transducer $TR_2$. Time passes as these signals pass along a channel that includes the portion of the interior of pipe 12, and any material inside that pipe, that is generally along the dashed line shown in FIG. 1. This time is referred to in the art as time of flight (TOF). Thus, the DNS TOF occurs between times $t_0$ and $t_2$, or it may be measured relative to some known offset from either of those times.

At time $t_2$, second transducer $TR_2$ begins to respond to the pulses transmitted by first transducer $TR_1$, as shown by the received signal that begins at time $t_2$. Processor 14, being coupled to second transducer $TR_2$, is operable to sample this received signal. Toward this end, processor 14 is typically programmed to begin capturing signals from second transducer $TR_2$ at a time slightly before the expected response at time $t_2$. While the received signal is analog, the captured samples are typically in digital form, so included in the sampling is an analog-to-digital (ADC) conversion, either as part of processor 14 or an additional intermediate device (not shown). Moreover, the sampling rate is commonly, but not necessarily, a multiple of (e.g., four or five times) of the pulse frequency $f_{PLS}$ or of the entire pulse train frequency or of the nominal or expected resonance frequency. For each sample, a sample amplitude $S_x$ is stored, and also preferably stored is a corresponding sample time $st_x$ of when the sample was taken. Note that sample time $st_x$ can be an actual time or based on a count of either time or a number of samples (which thereby can represent time based on the sample period). For sake of reference, therefore, each sample may be represented by the data pair of ($S_x$, $st_x$). In any event, ideally, the received signal at time $t_2$ will generally increase toward a peak amplitude at time t and decay thereafter, as the transmitted pulses create an oscillatory response in, and due to the resistive/inductive/capacitive (RLC) nature of, the receiving transducer $TR_2$. Then, by time $t_4$, the received signal will decay to a zero or non-zero state.

At time $t_5$, which is preferably some time after the amplitude of the received signal at transducer $TR_2$ has sufficiently declined, processor 14 reverses the communication direction of system 10, such as via a multiplexer (MUX) operation. Thus, at a later time $t_5$, the above process repeats, but in the reverse (i.e., UPS) direction, that is, from second transducer $TR_2$ to first transducer $TR_1$. From the preceding discussion, therefore, one skilled in the art will appreciate that at time $t_5$, processor 14 applies an excitation pulse train at frequency $f_{PLS}$ to second transducer $TR_2$, causing it to commence emission of a corresponding pulse train, where both the excitation and resultant transmission pulse train consist of the same number of pulses (e.g., 10 to 40) as for the DNS pulses and hence through time $t_6$, directed to reflector $R_2$, which reflects them to reflector $R_1$, toward transducer $TR_1$. Following the TOF of these pulses, at time $t_7$, first transducer $TR_1$ begins to respond to the pulses transmitted by second transducer $TR_2$, with the transducer $TR_1$ received signal again detected, converted to digital, and sampled by processor 14, increasing toward a peak amplitude at time $t_8$, and decaying thereafter to a zero or near-zero level by time $t_9$.

Given the timing of FIG. 2, processor 14 is operable (e.g., via appropriate programming) to determine the UPS TOF, the DNS TOF, and the relative difference of the UPS and DNS TOF, using preferred embodiment methodologies detailed later. From these measures, the flow rate through pipe 12 may be calculated, for example, based on the following Equation 1:

$$v = \frac{L}{2} \times \left(\frac{1}{TR_{12}} - \frac{1}{TR_{21}}\right) = \frac{L}{2} \times \left(\frac{TR_{21} - TR_{12}}{TR_{21}TR_{12}}\right) \quad \text{Equation 1}$$

where,

L is the length of the channel path between first transducer $TR_1$ and second transducer $TR_2$;

$TR_{12}$ is the DNS TOF;

$TR_{21}$ is the UPS TOF; and v is the velocity of flow.

Note from Equation 1, therefore, that flow velocity is directly related to the DNS and UPS TOF, and the difference between them. Thus, processor 14 may measure a set of UPS and DNS TOF, or multiple sets, and accordingly determine flow velocity based on those measures. Moreover, the accuracy of the TOF measures directly influences the accuracy of the velocity determination.

As would be expected, if flow is in one direction, then the TOF in that direction should be less than the TOF in the opposite direction. Moreover, if there is no flow in pipe 12

(or it is empty), then the UPS and DNS TOF should be equal. Such expectations, however, represent ideal devices and conditions. The present inventors have recognized, however, that various factors will influence these considerations and may cause errors in flow measurement calculations. For example, each of transducers $TR_1$ and $TR_2$ has a nominal resonance frequency, so that nominally each also should be excited at a frequency at or closest to that frequency. However, based on manufacturing variability as well as potential changes over time, the actual resonance frequency of a transducer may depart from its nominal value, thereby creating an impedance mismatch and changing the channel resonance frequency. As a result, exciting a transducer with a signal based on the nominally expected system resonant frequency could cause a less than optimal response in the received signal of the other transducer. Aging also may affect each transducer and also the channel in pipe 12, which is necessarily part of the overall bi-directionally analyzed system. For example, sedimentation may form or change, thereby changing the overall system resonance frequency. Once more, therefore, if a non-resonance frequency excitation signal or pulse is transmitted through the system, then the response at the receiving transducer, including its sensitivity to any impedance mismatch between the transmitting and receiving transducer, will be less than optimal and, hence, more prone to measure/detection errors. Other factors affecting resonance can include variability of devices for the same manufacturer or for devices from different manufacturers. Still other factors are the medium through which the waves pass and the temperature to which the system (and particularly the transducers) are exposed. In view of these considerations and others as may be ascertained by one skilled in the art, the preferred embodiments implement additional improvements in system 10, as further explored below.

Figure 3:
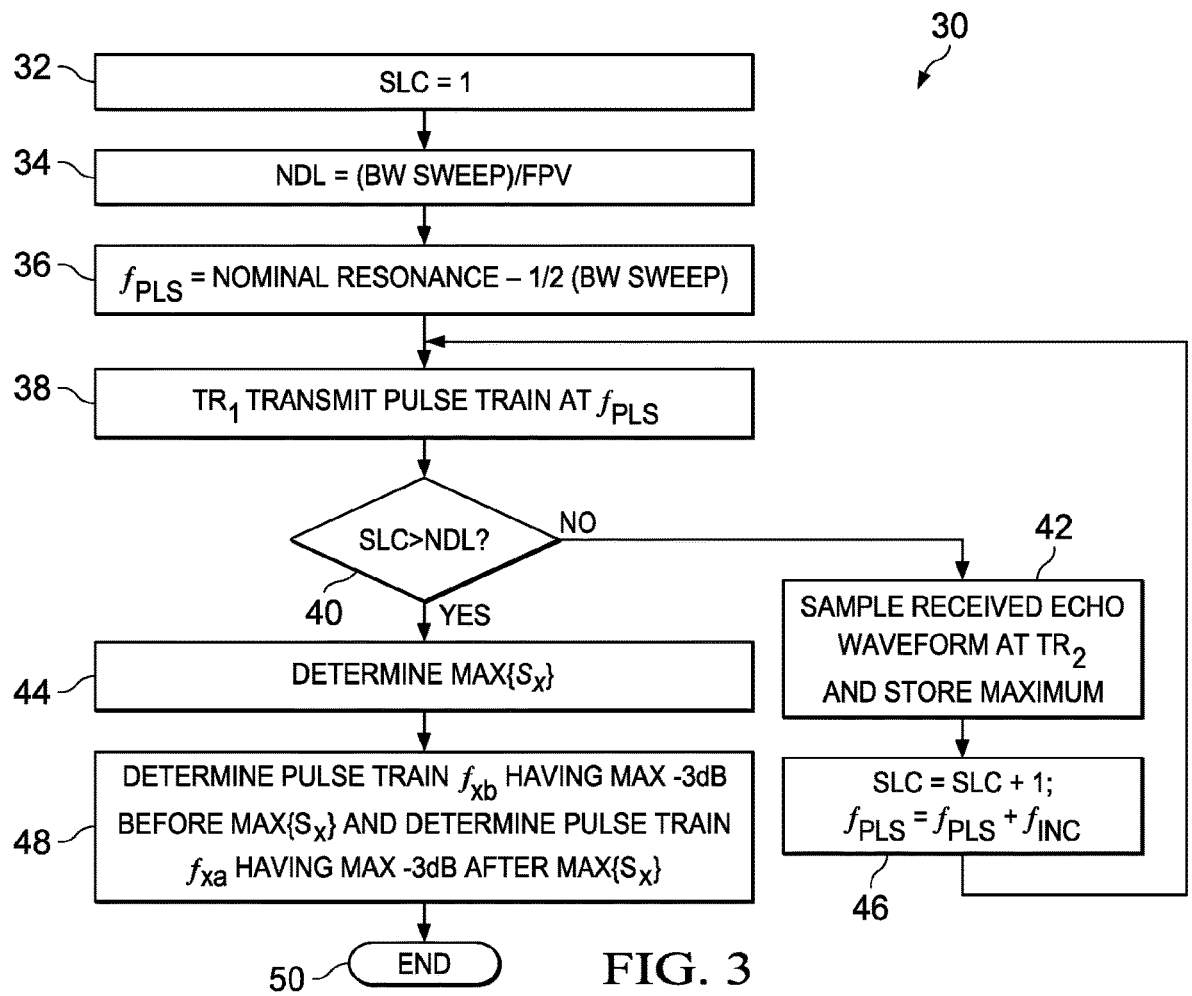
FIG. 3 illustrates a flowchart of a first method of operation of the processor of FIG. 1.

FIG. 3 illustrates a flowchart of a method 30 of operation of processor 14 from system 10, as may be implemented with appropriate instructions stored in the processor and/or computing-device readable media, including hardware, firmware, software, or any combination thereof. By way of introduction, method 30 includes an iterative methodology to first estimate two different frequencies at the 3 dB points relative to an estimable center resonant frequency response, after which another method excites one transducer at a time, where the excitation signal is a series of pulses at the two different frequencies so determined.

Method 30 commences with a step 32, where processor 14 initializes a sweep loop counter SLC=1, where as demonstrated later SLC counts (and is incremented) as each loop, in a total of NDL loops are reached, in method 30 so as to apply a single tone pulse train to a transducer per each of the NDL loops, and to thereafter evaluate an echo waveform response to the single tone pulse train. Next, method 30 continues to step 34.

Recalling from above that a preferred embodiment applies a different pulse train frequency per each of NDL loops. Step 34, therefore, determines the number of those NDL loops. In the illustrated approach, processor 14 determines the desired number for NDL, that is, the number of times a respective single tone pulse train is applied to a transducer. In a preferred embodiment, the combination of all of the NDL loops will, as a whole, sweep across a total bandwidth of frequencies; in other words, the first loop pulses at one frequency, followed by a next loop at a next frequency, and so forth for to complete with a total of NDL loops, thereby covering an entire bandwidth indicated by a value BW SWEEP. Moreover, each loop frequency is separated from the previous loop frequency by a frequency partition value FPV In step 32, therefore, the total bandwidth BW SWEEP is partitioned into NDL loops, where NDL is set as BW SWEEP divided by the frequency partition value FPV, thereby dividing the bandwidth into different frequencies such that each different loop provides a pulse train at a respective different frequency. For example, assume that BW SWEEP=200 kHz, and assume also that a desirable partition for each iteration of a sweep across those 200 kHz is FPV=5 kHz. In that case, then NDL=BW SWEEP/FPV=200/5=40, which as shown below will thereby cause the 200 kHz bandwidth to be swept at 5 kHz intervals, starting at 100 kHz and for a total of NDL+1 pulse trains. Next, method 30 continues to step 36.

In step 36, processor 14 initializes a pulse frequency value $f_{PLS}$, which as shown later indicates a frequency at which each pulse in a pulse train set of single tone pulses is to be transmitted. Since step 36 initializes fPL, and in a preferred embodiment the first (i.e., initialized) value is set at one end of the entire bandwidth through which the total NDL+1 pulse trains will sweep. To achieve this setup, step 36 sets $f_{PLS}$ equal to the nominal, or estimated, or approximated frequency resonance of system 10 minus ½ BW SWEEP. It is noted that the nominal, or estimated, or approximated frequency resonance in this regard ultimately may be away from the actual system resonance, but step 36 represents a starting point, such as may be derived anecdotally or from manufacturer specifications, where later steps will converge toward exciting the system at or near it actual resonance frequency. In any event, as a numeric example, assume that system 10 is specified (e.g., by manufacturer or empirical testing) to have a nominal, estimated, or approximated resonance frequency of 200 kHz, and recall the example above where BW SWEEP=200 kHz. Thus, in step 36, $f_{PLS}$=200 kHz−½ (200 kHz)=100 kHz. Next, method 30 continues to step 38.

In step 38, one of the two transducers is selected to begin transmitting pulses, so for sake of example in method 30 the selection is transducer $TR_1$. Note that for purposes of identifying maximum amplitude response, only one of the two stream directions needs to be analyzed since there is a single channel response—hence, for step 38, it does not matter which of the two transducers is selected for transmission. Thus, for the first instance of step 38, that is, where SLC=1, then, by way of example, transducer $TR_1$ transmits a first pulse train (which instead could have been transducer $TR_2$), with a number of pulses as may be selected by one skilled in the art (e.g., 40), at the pulse frequency $f_{PLS}$ established in step 36. Thus, for the numeric examples given earlier, for this first instance, then the first pulse train is transmitted with pulse each at $f_{PLS}$=100 kHz. Next, method 30 continues to step 40.

In step 40, a condition is evaluated to determine whether the sweep loop counter SLC exceeds the number of desired loops NDL, the total of which will sweep the entire desired bandwidth BW SWEEP. If step 42 does not find that SLC>NDL, then method 30 continues to step 42, whereas if SLC>NDL, then method 30 continues to step 44.

In step 42, the transducer opposite of the one that transmitted, so in the current example transducer $TR_2$ which is opposite in system 10 of the transmitting transducer $TR_1$, receives an echo waveform in response to the pulses transmitted by transducer $TR_1$. Thus, when transducer $TR_1$ transmits pulses, then in step 42 processor 14 samples the echo waveform amplitude $S_x$ received by transducer $TR_2$ (or, in opposite fashion, if transducer $TR_2$ had transmitted the pulses, then step 46 samples the echo waveform received by transducer $TR_1$). As introduced earlier, the preferred embodiment preferably digitally samples (i.e., via an ADC) at a rate so that a number of samples are taken per cycle of the received waveform, where the rate may be a multiple of the average transmission frequency, by way of example. Each sample $S_x$ may be stored, although in an alternative preferred embodiment, and for reasons evident later, only the maximum sample value is stored for the given loop index of SLC. Next, method 30 continues to step 46.

In step 46, two operations occur to prepare the looping portion of method 30 for its next iteration, that is, to facilitate a next successive pulse train transmission at an increased frequency $f_{PLS}$, relative to the pulse frequency from the immediately preceding iteration of the method loop. More specifically, step 46 increments the sweep loop counter SLC. Additionally, step 46 increases the current frequency $f_{PLS}$ by the frequency partition value FPV, discussed earlier in connection with step 34. Using the numeric examples from above, therefore, recall that FPV=5 kHz, and note for the first iteration of the loop of method 30, that $f_{PLS}$=100 kHz. Thus, for the first iteration where step 46 is reached, then the sweep loop counter SLC is incremented from one to two, and the pulse frequency $f_{PLS}$ in increased from 100 kHz to 105 kHz (i.e., $f_{PLS}=f_{PLS}$+FPV=100 kHz+5 kHz). Before proceeding, note also that the present discussion contemplates increasing frequency across the NDL loops, from a relatively low value in the BW SWEEP to a relatively high one; in an alternative preferred embodiment, however, the reverse occurs, whereby the NDL loops start at a relatively high frequency and then decrease, in which case step 46 would decrease the current frequency, rather than increase it. In any event, following step 46, method 30 returns to a next iteration of step 38, with the immediately-preceding adjustments from step 46. Thus, in this next iteration of step 38, transducer $TR_1$ transmits a next successive pulse train of a number of desired pulses (e.g., again, 40), with each pulse transmitted at the now-increased frequency of $f_{PLS}$. Thus, for the second instance of step 38, each pulse in the second pulse train is transmitted by transducer $TR_1$ at a frequency of 125 kHz.

From the above, one skilled in the art will appreciate that the method 30 initialization steps and loop perform an iterative methodology so that a transducer (e.g., $TR_1$) transmits a total of NDL+1 pulse trains, with each pulse train having pulses at a respective single tone or frequency. Particularly, the looping continues to increment the sweep loop counter SLC in the current example until it reaches 41 pulse trains, with each increment also corresponding to a transmitted pulse train at an increment of 5 kHz. The condition of step 40 is found as true when SLC>NDL, which in the current numbers occurs when 41>40, that is, after the $41^{st}$ pulse train has been transmitted. Thus, in the example provided, the respective different frequency $f_{PLS}$ increases linearly among the total NDL+1 pulse trains. The following Table 1 illustrates a representative number of the entirety of the pulse trains, again for the example of NOMINAL RESONANCE=200 kHz, BW SWEEP=100 kHz, and FPV=5 kHz.

TABLE 1

| SLC | $f_{PLS}$ |
| --- | --- |
| 1 | 100 kHz |
| 2 | 105 kHz |
| 3 | 110 kHz |
| 4 | 115 kHz |

TABLE 1-continued

| SLC | $f_{PLS}$ |
| --- | --- |
| 5 | 120 kHz |
| 6 | 125 kHz |
| . | . |
| . | . |
| . | . |
| 39 | 290 kHz |
| 40 | 295 kHz |
| 41 | 300 kHz |

Table 1, therefore, summarizes a general pattern of the linear increase of each pulse train relative to the pulse train either/or preceding or following it, so that the entirety of the NDL+1 pulse trains sweeps across an entire desired bandwidth, as may be established with the value, BW SWEEP, centered approximately about an estimated NOMINAL RESONANCE of system 10. Still further, note that alternative preferred embodiments excite the transducer with transducer excitation waveforms other than a pulse train, that is, other types of signals that are periodic and have a known amplitude and frequency, where such signal is further modified per the preferred embodiments to have partitions with each partition having a different respective frequency during the excitation period (e.g., between $t_0$ and $t_1$ in FIG. 2). For example, an alternative excitation waveform could be a continuous sinusoidal signal of a known amplitude and frequency coming from a resonant circuit; thus, if Table 1 is applied to such a waveform, a first sinusoid is applied as an excitation signal at 100 kHz, followed by a second sinusoid applied as an excitation signal at 105 kHz, and so forth up through the final sinusoid applied as an excitation signal at 300 kHz. In any event, therefore, the term waveform in the context of transducer excitation preferably includes such other variations. In any event, once the frequency sweep by a waveform at different frequencies is complete, as indicated by the affirmative finding in step 40, method 30 continues with step 44.

Figure 4:
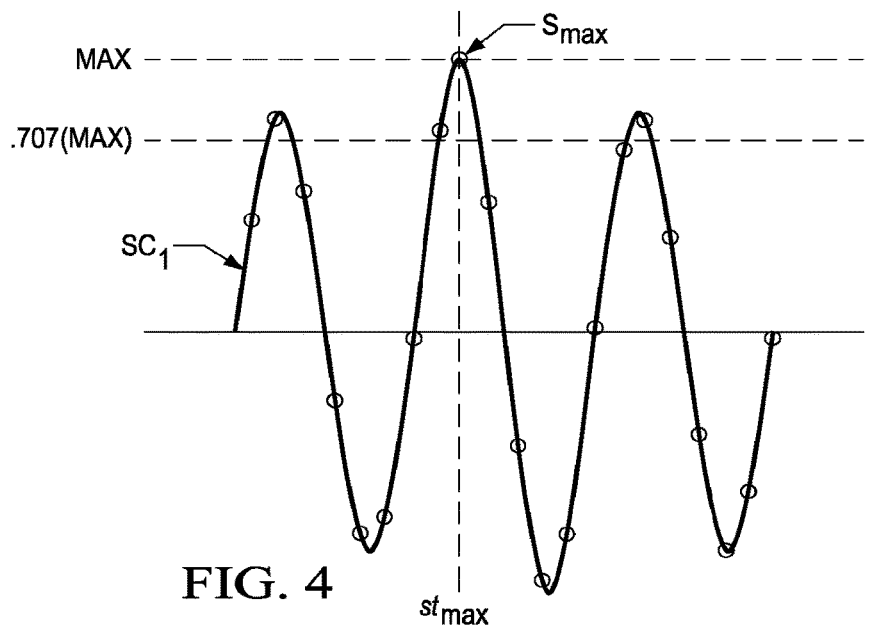
FIG. 4 depicts a number of samples of a few cycles in a detected echo waveform according to a preferred embodiment.

In step 44, processor 14 determines a maximum of the maximum amplitude samples collected in step 42. In other words, with the preceding having stored NDL+1 maximum amplitudes, corresponding to the NDL+1 different pulse train frequencies, step 44 identifies the largest of those NDL+1 amplitudes. Note that in a preferred embodiment only the absolute largest amplitude is detected and is sufficient; however, if computational complexity is not a concern, an envelope detector also could be implemented to identify the largest point of amplitude among (and between) these stored amplitudes. In FIG. 3, therefore, step 44 is shown as a maximum function of all maximum samples $S_x$. By way of example, therefore, FIG. 4 illustrates a generally sinusoidal curve $SC_1$ (shown in dotted line) as a depiction of a few cycles in one of the analog waveforms received by transducer $TR_2$ according to one of the various frequency pulse trains that were transmitted, where the particular waveform shown includes the maximum amplitude Sax achieved by the echo waveform. Further, because in the preferred embodiment digital sampling is taken of the received waveform, then circles along curve $SC_1$ represent the time of such samples, where assume for sake of example that the sampling rate is approximately eight times the frequency of the illustrated cycles of the waveform, so each illustrated waveform period includes approximately eight samples (i.e., eight circles). Thus, one particular circle along the curve $SC_1$ represents the peak sample amplitude $S_{max}$, which returning to FIG. 3, is readily determined in step, such as by examining absolute values of the entire set of sample amplitudes. Next, method 30 continues to step 48.

Step 48 is further appreciated by additional reference to FIG. 4. Recall that FIG. 4 illustrates the step 44 detected largest amplitude, $S_{max}$, achieved by any of the NDL+1 waveforms, where each of those waveforms corresponds to a different single tone excitation pulse train. Also shown in FIG. 4 is a level reduced relative to that maximum, where in one preferred embodiment the reduction is found at 0.707 times the maximum, $S_{max}$. Thus, in a preferred embodiment, a predetermined percentage equal to 70.7%, which as known in the art corresponds to a 3 dB point, is identified relative to $S_{max}$, and then step 48 identifies which pulse train at a frequency before, and which pulse train at a frequency after, the step 44 detected pulse train, had a respective maximum at the 3 dB point. For example, assume step 44 detects the largest maximum achieved, among all NDL+1 echo waveforms, to be 1.0 volt, in which case step 48 identifies each of an earlier and later waveform having a maximum peak closest to 0.707 times that 1.0 volt, that is, having a peak closest to 0.707 volts. Moreover, because of the oscillatory nature of the transducer, and the sweeping across the entire bandwidth of all the NDL+1 pulse trains, then one waveform caused by a frequency lower than that of the step 44 detected waveform will have the closest $S_{max}$ to 0.707 volts, and likewise one waveform caused by a frequency higher than that of the step 44 detected waveform will have the closest $S_{max}$ to 0.707 volts. Step 48 identifies these two waveforms, and it also identifies the respective pulse train frequency for each such waveform, where for reference such frequencies are hereafter referred to as $f_{xb}$ for that waveform before the step 44 detected waveform, and $f_{xa}$ for that waveform after the step 44 detected waveform. Thus, the pulse train transmitted at frequency $f_{xb}$ caused an echo waveform, before and in response to a lower excitation frequency than that which caused the waveform detected in step 44, and the echo waveform resulting from frequency $f_{xb}$ has a maximum amplitude closest to 3 dB lower, and resulting from a lower excitation frequency, than the step 44 detected waveform. Similarly, the pulse train transmitted at frequency $f_{xa}$ caused an echo waveform, after and in response to a higher excitation frequency than that which caused the waveform detected in step 44, and the echo waveform resulting from frequency $f_{xa}$ has a maximum amplitude closest to 3 dB lower, and resulting from a higher excitation frequency, than the step 44 detected waveform. The two frequencies, $f_{xb}$ and $f_{xa}$, are preferably stored for additional use in a preferred embodiment methodology described below. Thus, as shown in FIG. 3, following step 50, method 30 ends, as shown by a step 50.

Given the preceding, note thus far the description has presented a preferred embodiment apparatus and methodology that in a first set of steps emits a number of pulse trains to a first of two transducers in a system, where the frequency of pulses in each respective train sweep across a predetermined bandwidth. In response to the pulse train, an echo waveform is induced in a second of the two transducers in the system, and a processor samples that waveform to determine an approximate maximum in the waveform. From two of those waveforms, having respective peaks at a percent (e.g., 70.7%) of the maximum peak across all of the bandwidth, first and second frequencies are identified, before and after the identified maximum. With such aspects and as detailed below, the preferred embodiment further operates to thereafter excite each system transducer first with one of the first and second frequency followed immediately thereafter by exciting that same transducer with the other of the first and second frequency, so as to yield an improved manner of detecting TOF measures and thereby improving for example, and as also shown later, a velocity measure associated with the system. Additional details with respect to such further preferred embodiment aspects are explored later, following a discussion of an alternative preferred embodiment for identifying the first and second frequencies that are identified for subsequently exciting each system transducer.

Figure 5:
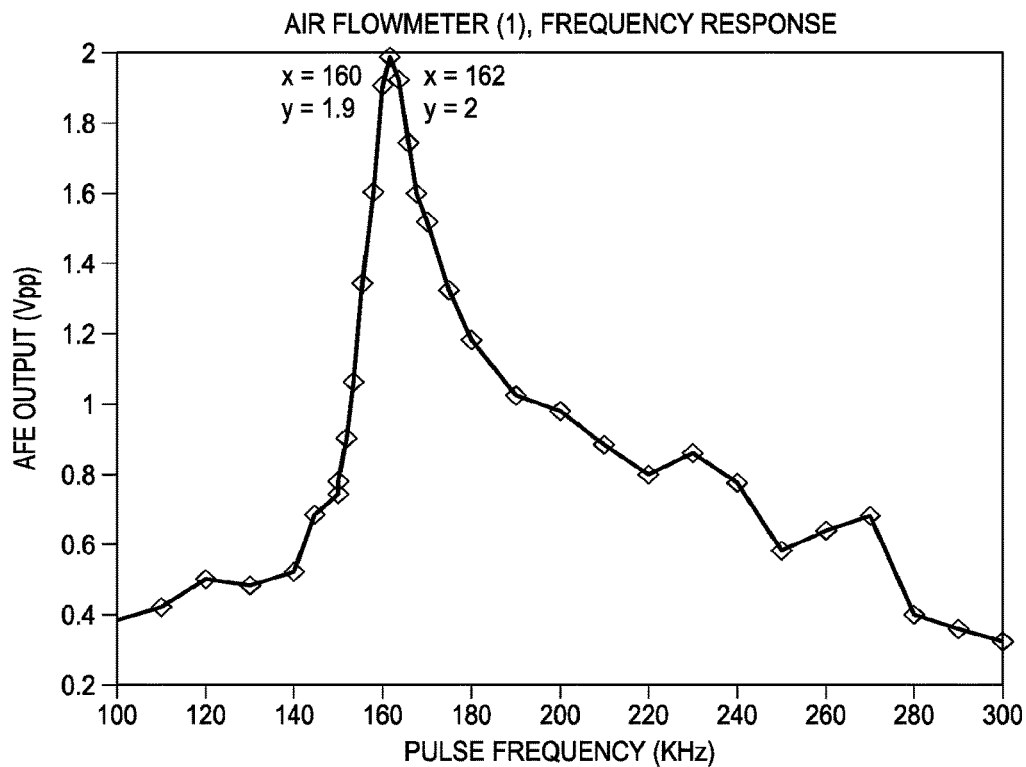
FIG. 5 illustrates a frequency response plot for a transducer flowmeter system such as system 10 in FIG. 1.
Figure 6:
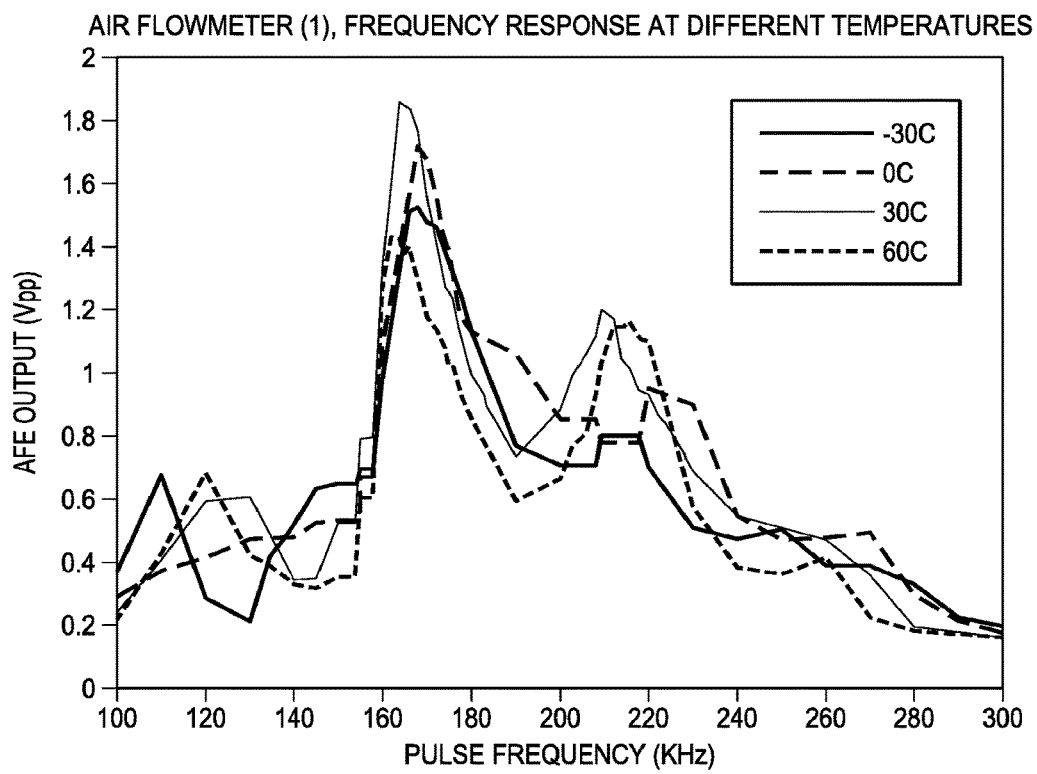
FIG. 6 illustrates four frequency response plots for a first flowmeter system such as system 10 in FIG. 1, where each plot corresponds to a different temperature.

By way of further elaboration, FIG. 5 illustrates a frequency response plot for a transducer flowmeter system such as system 10 in FIG. 1. Frequency is shown along the horizontal axis and detected amplitude response along the vertical axis. For the given system, therefore, it may be seen that a single peak response occurs at approximately 162 kHz. Moreover, it also may be observed that the system has a relatively wide bandwidth even at its 3 dB points, which occur at approximately 1.4 volts and, hence, between frequencies of 156 kHz to 172 kHz. In this regard, therefore, as the above-described preferred embodiment will excite the system at those 3 dB points, the response should be sufficiently detectable so as to provide a reasonable measure for detecting TOF measures. By way of further contrast, however, FIG. 6 again illustrates frequency response for a transducer flowmeter system such as system 10 in FIG. 1, but in FIG. 6 four different plots are shown, where each plot corresponds to frequency response at a different respective temperature. Taking the temperature variations into account, therefore, note that a first frequency of resonance occurs as the frequency sweeps in the range of 160 to 170 kHz, while for the same system, at various changes in temperature, a second frequency of resonance occurs in the range of 210 to 220 kHZ. These findings suggest what is referred to herein as a bi-modal frequency resonance, that is, one with two different peak frequencies. Accordingly, in an alternative preferred embodiment, steps 44 and 48 of method 30 (see FIG. 3) are modified so as to determine if there are two different maximum values, separated by a sufficient frequency bandwidth so as to suggest a dual mode system. If such a determination finds two such values, then step 48 is modified to $f_{xb}$ and $f_{xa}$ not as 3 dB points as in the earlier preferred embodiment, but instead at the center frequencies (or approximations thereof) of the two different, but bandwidth separated, peak frequency responses. Thus, when system 10 is later excited by the two frequencies from step 48, those frequencies will be in the frequency region anticipated to be that of the peaks in FIG. 6. Note, therefore, that the preferred embodiment is effective, for example, in a transducer system that has either a known single resonant frequency peak or a bi-modal frequency response, where the latter has been shown to be anticipated in environments where temperature is changing.

Figure 7:
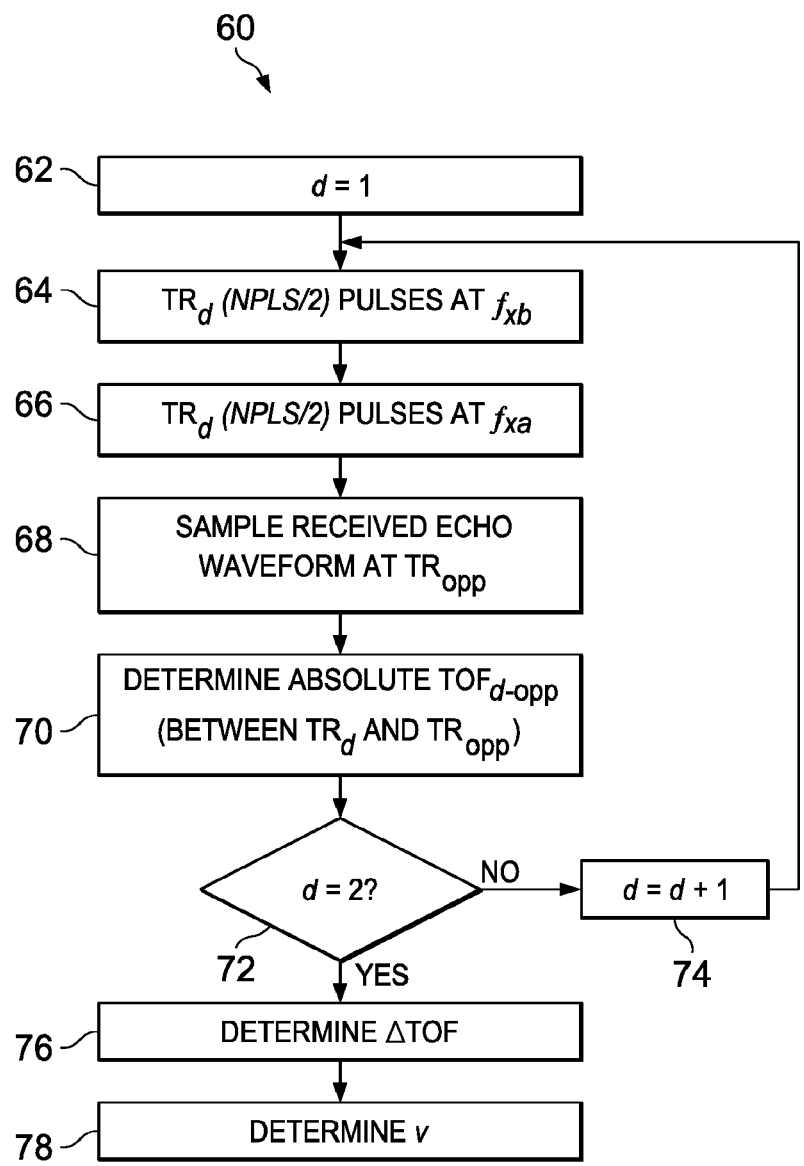
FIG. 7 illustrates a flowchart of a second method of operation of the processor of FIG. 1.

FIG. 7 illustrates a flowchart of an additional method 60 of operation of processor 14 from system 10, and toward achieving various aspects introduced above. By way of introduction, method 60 includes an iterative methodology to excite one transducer at a time, where the excitation signal is again a series of pulses, where the pulse frequency is changed so that a first set of pulses uses the frequency $f_{xa}$ and a second set of pulses uses the frequency $f_{xb}$, where both such frequencies were determined in step 48 of FIG. 3. For each excited transducer, a corresponding echo waveform is sampled at a receiving transducer, where correlation methodologies are used to determine the DNS TOF, the UPS TOF, and the difference between those TOFs, after which the velocity and volume of flow determination is made from Equation 1. Additional details are shown in FIG. 7 and Figures provided thereafter.

Method 60 commences with a step 62, which establishes a direction index d. As better understood from the remaining discussion, the direction index d facilitates frequency pulse transmissions for a first direction (i.e., d=1), followed later by frequency pulse transmissions for a second direction. (i.e., d=2). Thus, in step 62, the direction index d is initialized to a value of one. Next, method 60 continues to a step 64.

Figure 8:
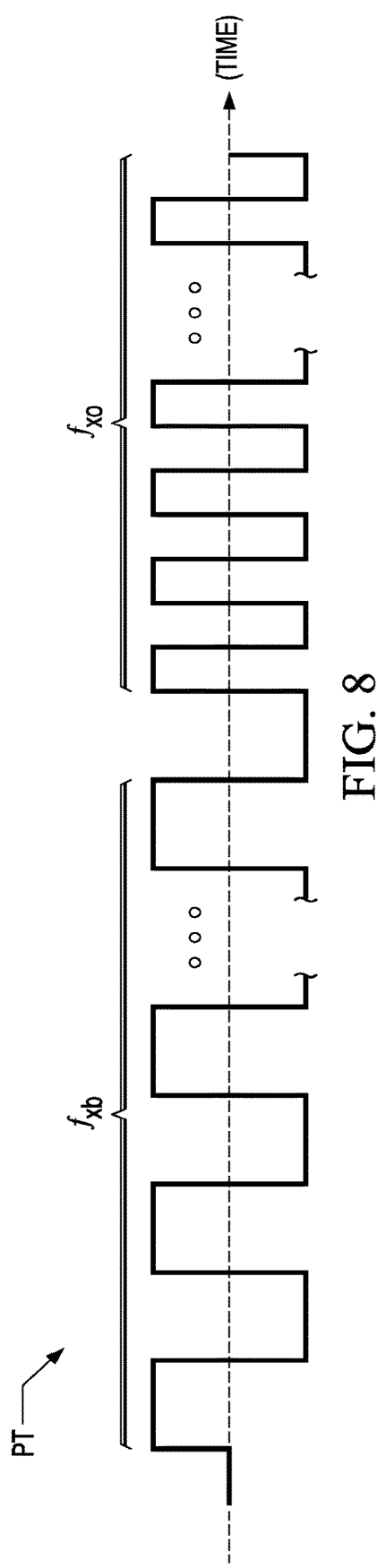
FIG. 8 depicts a sequence of pulses with two tone frequencies according to a preferred embodiment.

In step 64, the transducer $TR_d$, meaning the transducer of system 10 with the index d as its subscript, transmits a number NPLS/2 pulses at the frequency $f_{xb}$. In a preferred embodiment, NPLS is number of pulses in a pulse train, where in an earlier example a pulse train was mentioned as 40 pulses, so here again consider NPLS=40. In step 64, that number is divided by two, so in the example where NPLS=40, then for the first instance of step 64, where step 62 initialized d=1, then transducer $TR_1$ transmits NPLS/2=40/2=20 pulses at the frequency $f_{xb}$ established in method 30. By way of illustration, therefore, FIG. 8 depicts a first sequence of such pulses, each having a same frequency $f_{xb}$, thereby representing total of NPLS/2=20 pulses. Next, method 30 continues to step 66.

In step 66, the transducer $TR_d$ transmits NPLS/2 pulses at the frequency $f_{xa}$. Thus, following step 64 which also transmitted NPLS/2 pulses, step 66 does the same, but at the different (and higher) frequency of $f_{xb}$. Note, therefore, that the earlier step 64 excites the transducer at a first frequency, either of what was estimated or determined as an approximate first 3 dB point frequency on one side of the maximum response frequency or corresponding to a first peak response in a bi-modal system, while step 66 excites the transducer at a frequency of what was estimated or determined as an approximate second 3 dB point frequency on the other side of the maximum response frequency or corresponding to a second peak response in a bi-modal system. In this manner, therefore, two different frequencies, sometimes referred to as tones, are used to excite a transducer for a given pulse train and to cause a corresponding echo waveform in the opposite transducer. Next, method 60 continues to step 68.

In step 68, the transducer $TR_{opp}$, meaning the transducer opposite of transducer $TR_d$ in system 10, receives an echo waveform in response to the pulses transmitted by transducer $TR_d$. Thus, when transducer $TR_1$ transmits pulses, then step 68 samples the echo waveform received by transducer $TR_2$, and in opposite fashion, when transducer $TR_2$ transmits pulses, then step 68 samples the echo waveform received by transducer $TR_1$. Sampling according to step 68 may follow the same various principles discussed above with respect to step 44 in FIG. 3, thereby digitally sampling the received echo waveform at some frequency so that multiple samples are captured per cycle of the echo waveform. Next, method 60 continues to step 70.

In step 70, processor 14 determines the absolute $TOF_{d\text{-}opp}$ as between the transmitting transducer $TR_d$ and the receiving transducer $TR_{opp}$. A discussion for a preferred embodiment of such a determination is provided later and, by way of introduction, is preferably achieved by correlating the transmitted waveform with a digital sampling of the received echo waveform. Next, method 60 continues to step 72.

In step 72, a condition is evaluated to determine whether two tone pulse train sequences, that is, each having a first set of pulses at one frequency followed by a second set of pulses at another frequency, have been transmitted in both the UPS and DNS directions. Specifically, the direction index d is evaluated to determine if it has reached a value of two. If d is less than two, method 30 continues to step 74, where d is incremented and method 60 returns back to step 64, thereby creating a loop in method 60. Specifically, with the return to step 64, the other of the two transducers transmits, in the opposite direction as compared to the prior instance of step 64 (and 66), NPLS pulses across two sets, the first set of NPLS/2 pulses transmitted in step 64 at the frequency $f_{xb}$, and the second set of NPLS/2 pulses transmitted in step 66 at the frequency $f_{xa}$. Thus, where the first set of NPLS pulses are transmitted in a first direction from transducer $TR_1$ to transducer $TR_2$, then a second iteration (i.e., for d=2) causes a second set of NPLS pulses to be transmitted in a second direction from transducer $TR_2$ to transducer $TR_1$ where again the NPLS pulses include a first and second tone transmission. Once the NPLS pulses are thereby transmitted in this second direction, steps 68 and 70 again occur, this time sampling the echo waveform received by transducer $TR_1$ and determining the absolute TOF as between transducer $TR_2$ and transducer $TR_1$ Next, method 60 continues to step 76.

In step 76, processor 14 determines delta TOF, that is, the difference in TOF determinations made by the two preceding iterations of step 70, that is, the difference between the UPS and DNS TOF determinations. As detailed below, a preferred embodiment for the step 76 determination correlates the samplings of the received DNS and UPS echo waveforms with each other, where the time shift as between the two represents the delta TOF value. As also later explained, because a two tone signal is used in creating each of the echo waveforms, a more robust and accurate correlation measure is achieved, thereby improving the accuracy and reliability of the delta TOF. Further in this regard, following step 76, in step 78 processor 14 determines flow velocity v, as preferably achieved by substituting the values of UPS and DNS TOF from step 70, and delta TOF from step 76, into Equation 1. Moreover, as each of those substituted values is improved by the processes described herein, then ultimately so is there an improvement in the step 78 velocity v determination.

FIGS. 9A through 9G illustrate a graphical representation of a correlation process used in a preferred embodiment to accomplish step 70 described above. Recall that step 70 determines absolute TOF, that is, TOF as between a pulse train PT transmitted by one transducer $TR_d$ and its corresponding echo waveform received at the opposing transducer $TR_{opp}$. By way of introduction to these Figures, therefore, the correlation is a time-shifting step-by-step comparison of two signals to one another, where for each step the comparison is at a different time-shifted position as compared to the preceding/following step. Correlation, if reaching the proper and desired result, determines a point in time when the two compared signals are closest/best aligned in time. As demonstrated by the following discussion, such a time may be used as either the completion, or reference, for determining the absolute TOF period. Also relevant to this discussion as a component of TOF is that it is known that some amount of time will be known to elapse as between the time the pulse train PT starts (e.g., to in FIG. 2) and the time the echo waveform starts to appear (e.g., $t_2$ in FIG. 2); for sake of discussion, this time is referred to as a preliminary offset time $pt_{ofs}$. As also detailed later, note that correlation may be expressed mathematically in various forms, such as an integration (or dot product) over time of one sample set relative to the other, where a maximum value in the mathematical result provides an indication of best alignment.

Figure 9A:
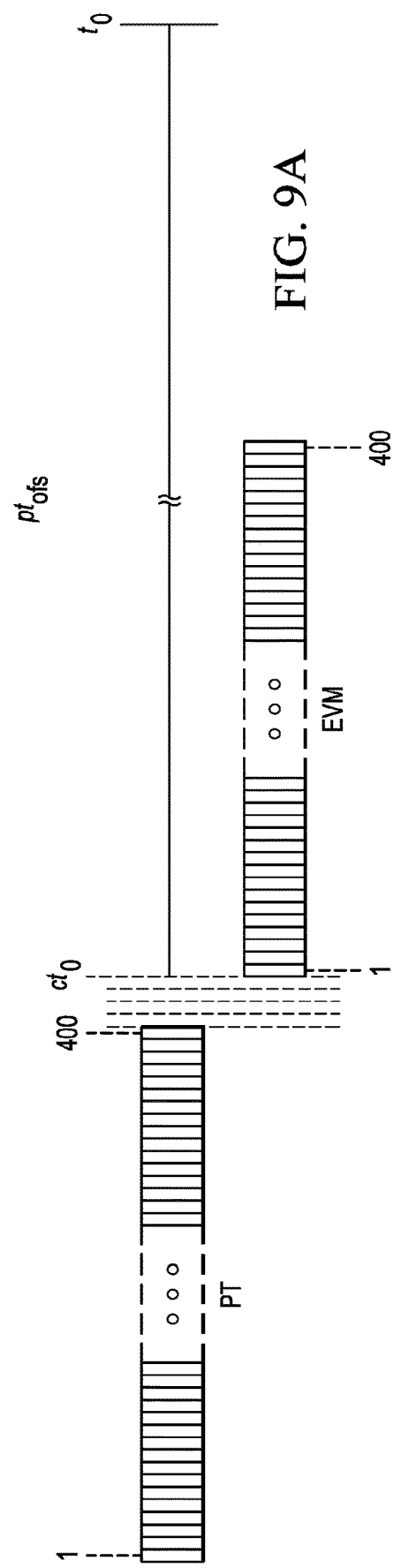
FIGS. 9A through 9G illustrate a digital sample set of the transmitted pulse train PT and a digital sample set of the received echo waveform EVM, with different time shifted correlation measures taken for the differing time-shifted positions of the sets.

Looking first to FIG. 9A, it is intended to illustrate a digital sample set having 400 samples of the transmitted pulse train PT and a digital sample set having 400 samples of the received echo waveform EVM (or of a received signal at an estimated time when the echo waveform is anticipated to arrive). For references, the first and last sample in each set are numbered 1 and 400 respectively, in these Figures. Note that having the same number of samples is used to simplify the present example, whereas in a preferred embodiment the length (i.e., number of samples) is greater for the echo waveform than for the pulse train. The vertical direction in FIG. 9A is intended to depict a time alignment, as further evident below, whereby a sample in one sample set is correlated with a sample in the other sample set that is in the same vertical time alignment. These same representations occur in the remaining FIGS. 9B through 9G, and in the latter Figures each represents a case where the two sample sets are further time shifted relative to one another, representing different time position comparisons of the sample set as part of the correlation process. Looking in more detail to FIG. 9A, following the preliminary offset time offset $pt_{ofs}$, the PT sample set and the EVM sample set are aligned in a starting correlation time $ct_0$. At this time alignment, a correlation measure is made from each sample set with the sample set aligned in the same vertical position; in FIG. 9A, however, none of the 400 samples in the PT sample set are vertically time aligned with any of the 400 samples in the EVM sample set. Hence, the mathematic implementation of comparison will yield a zero output (ignoring any noise), as each sample set is compared to a zero entity in the same vertical alignment.

Figure 9B:
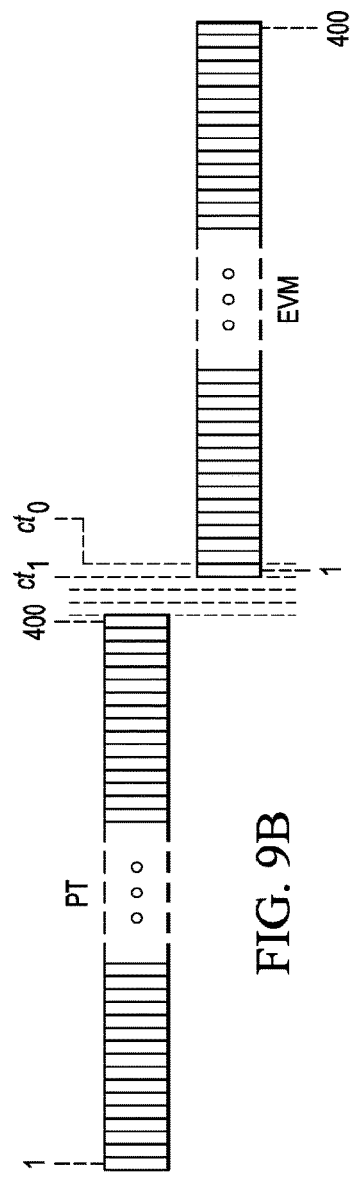

Looking next to FIG. 9B, it represents the sample set EVM shifted one time slot to the left, relative to FIG. 9A, thereby occurring at a sequentially-next correlation time $ct_1$. At this new time alignment, again a correlation measure is made from each sample set with the sample set aligned in the same vertical position; as was the case in FIG. 9A, however, again in FIG. 9B none of the 400 samples in the PT sample set is vertically time aligned with any of the 400 samples in the EVM sample set. Thus, the mathematic comparison will yield a zero output, as again each sample set is compared to a zero entity in the same vertical alignment. Indeed, note that FIG. 9C again illustrates a same result, as FIG. 9C depicts the sample set EVM shifted another single time slot to the left, relative to FIG. 9B, thereby occurring at a sequentially-next correlation time $ct_2$. As with all other instances in the correlation, at a given time alignment, again a correlation measure is made as between the sample sets and data in the same vertically-aligned position, but once more in FIG. 9C none of the 400 samples in the PT sample set is vertically time aligned with any of the 400 samples in the EVM sample set, thereby again yielding a zero output. One skilled in the art will appreciate that this process will repeat for the next two correlation times ($ct_3$ and $ct_4$, not shown), as for those time slots there still will be no time slot overlap as between the two sample sets.

Figure 9C:
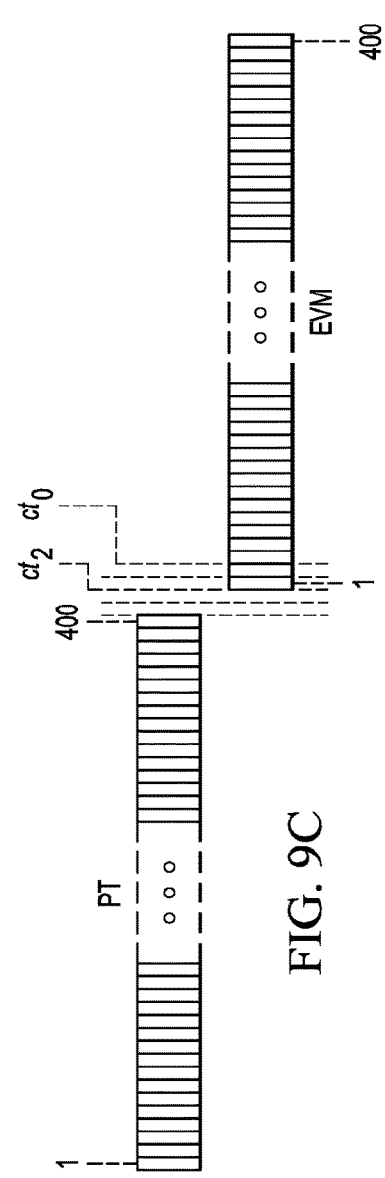
Figure 9D:
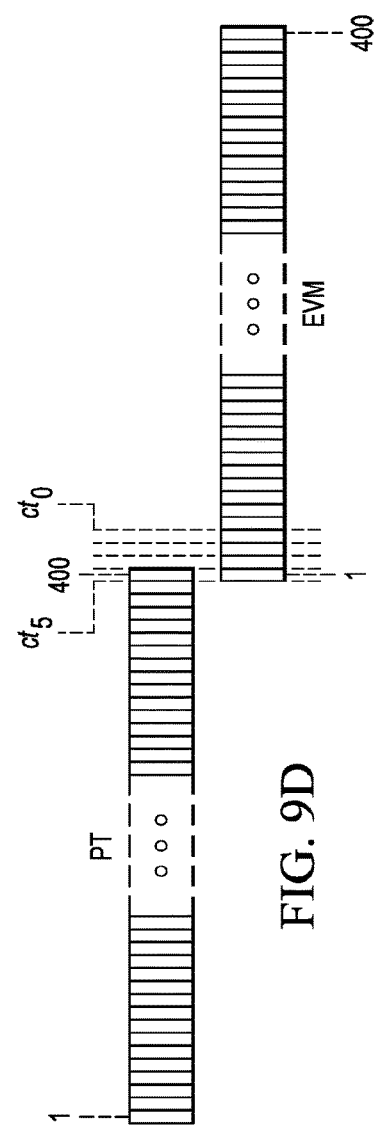

Looking next to FIG. 9D, it represents the sample set EVM shifted three time slots to the left, relative to FIG. 9C, thereby occurring at a correlation time $ct_5$. At this new time alignment, again a correlation measure is made from each sample set with the sample set aligned in the same vertical position; as was the case in the preceding FIGS. 9A-9C. In FIG. 9D, however, note that the first sample in the EVM sample slot (i.e., sample 1) aligns with the last sample in the PT sample set (i.e., sample 400). Thus, the mathematic comparison from the alignment of these single samples will yield an output greater than zero, but inasmuch as the remaining 399 samples of each set are not aligned to a sample in the opposing set, the total correlation result will still be a relatively low number.

Figure 9E:
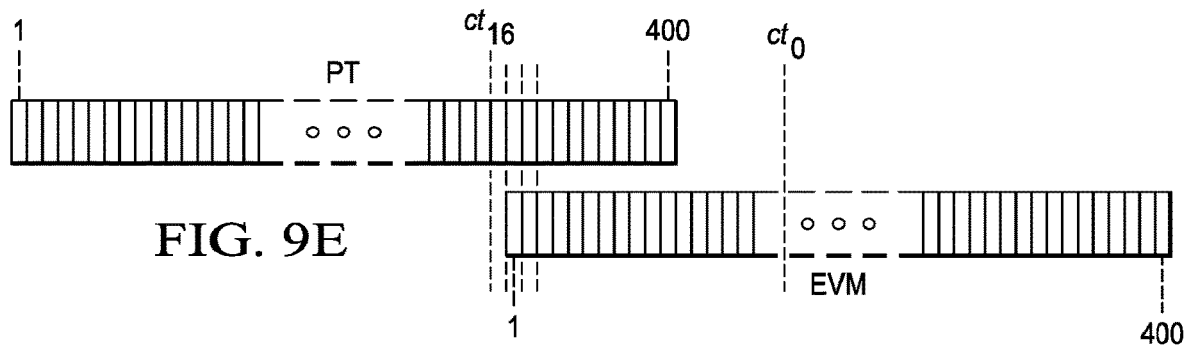
Figure 9F:
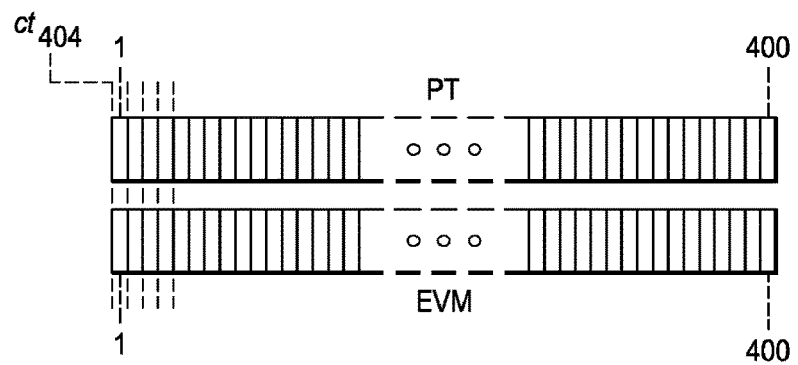
Figure 9G:
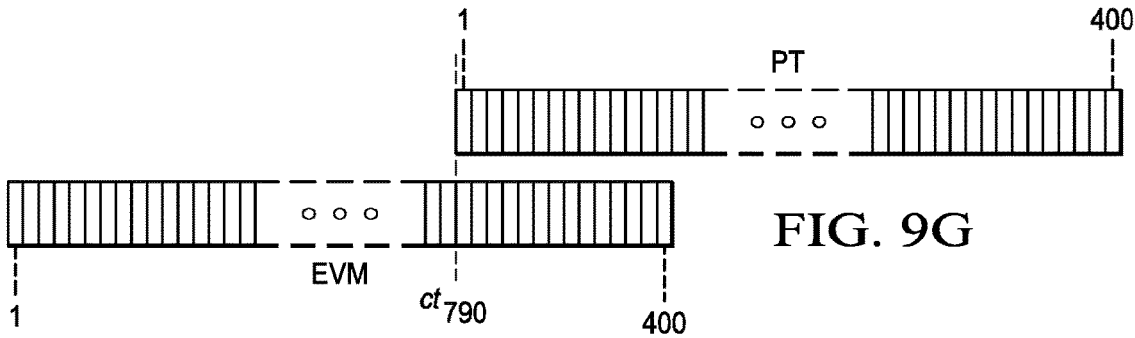

The above single time slot shift and correlation measure continues, as represented in the remaining FIGS. 9E, 9F, and 9G. By way of an arbitrary example, therefore, FIG. 9E represents the sample set EVM sample set shifted eleven time slots to the left, relative to FIG. 9D, thereby occurring at a correlation time $ct_{16}$, thus, in FIG. 9E, more data samples in the respective sets are aligned into respective time slots, which will result in an increased correlation measure, as compared to FIG. 9D. FIG. 9F represents the EVM sample set shifted numerous additional time slots to the left, relative to FIG. 9E, thereby occurring at a correlation time $ct_{404}$. FIG. 9F, therefore, is intended to illustrate the point in time when the two sample sets are completely aligned. Again for this time slot alignment, a correlation measure is taken, and the resultant value will ultimately prove to be the highest value of all eventually-completed correlation measures. This highest value, therefore, will confirm that the best match occurred at time $ct_{404}$, so the 404 time slots thereby indicated may be added to the preliminary offset time $pt_{ofs}$, thereby providing a total absolute TOF as between the pulse train PT and the resulting echo waveform EVM. Further in this regard, lastly FIG. 9G indicates the ongoing correlation process, as the EVM sample set continues to shift to the left for additional time slots, and at each a correlation measure is obtained so as to fully evaluate the potential time alignments of the two sample sets relative to one another. As the shifting continues in this manner, however, the respective correlation measures will be less than that of the fully aligned samples in FIG. 9F.

Having represented and described correlation in general, note that it may be implemented in various manners as ascertainable by one skilled in the art. In one preferred embodiment the following Equation 2 is used, as may be readily programmed into the operation of processor 14:

$$\text{corr}(k) = \sum_{i=1}^{l_2} r_1(i+k) r_2(i) \qquad \text{Equation 2}$$

where, $r_1$ is the received (either UPS or DNS) waveform;
$r_2$ is the reference (either DNS, UPS or TX) waveform;
$l_1$ is the length (number of samples) in $r_1$;
$l_2$ is the length (number of samples) in $r_2$; and
$k=(0 \ldots (l_1-l_2))$ and $(l_1 > l_2)$.

Having described various preferred embodiment aspects, a key benefit is now observed by returning to FIG. 9F. In FIG. 9F, note that the samples in the pulse train PT sample set necessarily reflect the frequency of the two tone signal illustrated in FIG. 8. Even though system 10 has an unknown or changing resonant frequency, the two frequencies as shown in FIG. 8 will cause a sufficiently high response in the echo waveform, as will be readily detectable by correlating with the pulse train. Thus, the EVM sample set will have its largest magnitude, that is, the peak response to the two frequencies, thereby improving the determinability of the time of that maximum. Specifically, with respect to time slots before or after that maximum amplitude time slot, then the EVM response will immediately start to reduce as compared to the EVM response in the maximum-peak-occurring time slot. Indeed because the preferred embodiment uses the two-toned pulse train, that reduction will occur not only in the EVM signal, but likewise it also will appear in the correlation measures, that is, the correlation for the peak-occurring time slot will be readily higher than the next highest peaks around it. Thus, correlating to the peak-occurring time slot should be readily resolvable per the preferred embodiments, so that only a single peak is determined in the correlation, thereby increasing the accuracy of the correlation. A more accurate correlation in turn provides a corresponding accuracy in the determination of the proper resonance-occurring time slot. As introduced earlier, therefore, the timing of the resonance-occurring time slot is then readily added to the preliminary offset time $pt_{ofs}$, thereby providing the absolute TOF in the direction being analyzed.

Also in a preferred embodiment, the method illustrated in FIGS. 9A through 9G, and the evaluation of Equation 2, are used to determine the relative TOF, that is, delta TOF is determinable by correlating the UPS and DNS echo waveforms. Thus, in this case, $r_1$ is one of the UPS or DNS echo waveforms, while $r_2$ is the other of those echo waveforms. In other words, as those waveforms will be similar as part of the same overall system response, then correlating them with one another will determine the difference in time as between the occurrence of one and the other—hence, delta TOF.

Figure 10:
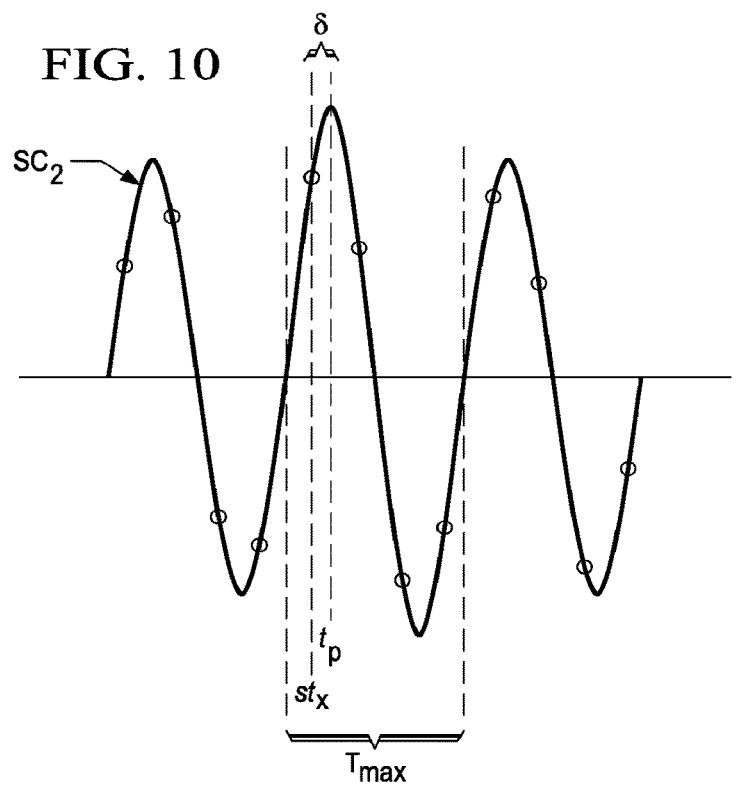
FIG. 10 illustrates a generally sinusoidal curve as a depiction of an analog correlation between the UPS and DNS waveforms.

As a further refinement to the preceding, it is noted that correlation of the UPS and DNS echo waveforms, particularly due to the use of the two-tone excitation signals, is well-suited to identify the particular time slot during which the DNS and UPS waveforms are most closely aligned, as the amplitude of the correlation signal during that time slot should be considerably larger than that of the amplitude in the adjacent time slots. However, within that single time slot, recall that multiple samples have been taken, as the sampling rate is a multiple of the approximate resonance frequency. In this regard, therefore, FIG. 10 illustrates a generally sinusoidal curve $SC_2$ (shown in dotted line) as a depiction of an analog correlation between the UPS and DNS waveforms. However, in the preferred embodiment, digital sampling and correlation of those samples are implemented, so circles along curve $SC_2$ represent the samples used in the correlation, where assume for sake of example that the sampling rate is approximately four times the frequency of the waveform, so each illustrated waveform period includes four samples (i.e., four circles). Further, curve $SC_2$ has a peak amplitude at a time t during a period, $T_{max}$, so that the peak correlation therefore occurs during $T_{max}$. Note, however, that peak time, $t_p$, is at a distance, $\delta$, from the nearest sample time $st_x$. Thus, the preferred embodiment determines delta TOF not solely from $T_{max}$, but also from the offset of the distance, $\delta$ from the peak time, $t_p$. To achieve this step, the preferred embodiment performs a three point correlation and an interpolation of points during $T_{max}$, such as a cosine interpolation, so as to approximate curve $SC_2$ and thereby determine the peak time, $t_p$, thereby further establishing the distance, $\delta$, to the nearest sample time. For example, such a correlation and an interpolation may be evaluated from three samples (and their respective sample times) that occur during $T_{max}$, as shown in the following Equations 4, 5, 6, 7, and 8:

$$\text{corr}(k) = \Sigma_{i=1}^{N-k} r_1(i+k) r_2(i) \quad \text{Equation 4}$$

where,
$r_1$ is the received (either UPS or DNS) waveform;
$r_2$ is the received (either DNS or UPS) waveform;
N is the length of the UPS and DNS waveforms; and
k is the shift index.

Equation 4 provides the correlation in the following Equation 5, so as to provide the three samples, $Z_{-1}$, $Z_0$, and $Z_1$, as further described below:

$$Z_n = \text{corr}(\hat{k} - n) \quad \text{Equation 5}$$

where, $$n = (-1, 0, 1)$$

$$\omega = \cos^{-1}\left(\frac{(Z_{-1} + Z_1)}{2 * Z_0}\right) \quad \text{Equation 6}$$

$$\varphi = \tan^{-1}\left(\frac{(Z_{-1} - Z_1)}{2 * Z_0 * \sin(\omega)}\right) \quad \text{Equation 7}$$

$$\delta = \frac{-\varphi}{\omega} \quad \text{Equation 8}$$

where,
$Z_0$ is the sample closest to $t_p$;
$Z_{-1}$ is the sample immediately before $Z_0$; and
$Z_1$ is the sample after $Z_0$.

The above-described correlation based methodology accounts for sample slips within a cycle (e.g., $T_{max}$) by ensuring $Z_0$ is always greater than $Z_{-1}$ and $Z_{+1}$. If $Z_0$ is not greater than $Z_{-1}$ and $Z_1$ then "n" in Equation 5 can be moved on either direction (−2, −1, 0) or (0, 1, 2) until the condition is satisfied. It is to be noted that delta TOF can be greater than a cycle at high flows, in which case a correlation-based technique cannot correct for a cycle slip. This situation is dependent on the resolvability between the correlation peak and the next highest peaks around it. Hence, the ratio between the correlation peak and the neighboring peak can be used as a measure to evaluate the performance of different excitation pulse techniques, where in the preferred embodiment the use of a multi-tone signal has been found to be very robust and immune to channel affecting issues (e.g., temperature, change in medium) and noise, so as to mitigate the possibility of sample slips and permit the use of the correlation-based technique.

Figure 11:
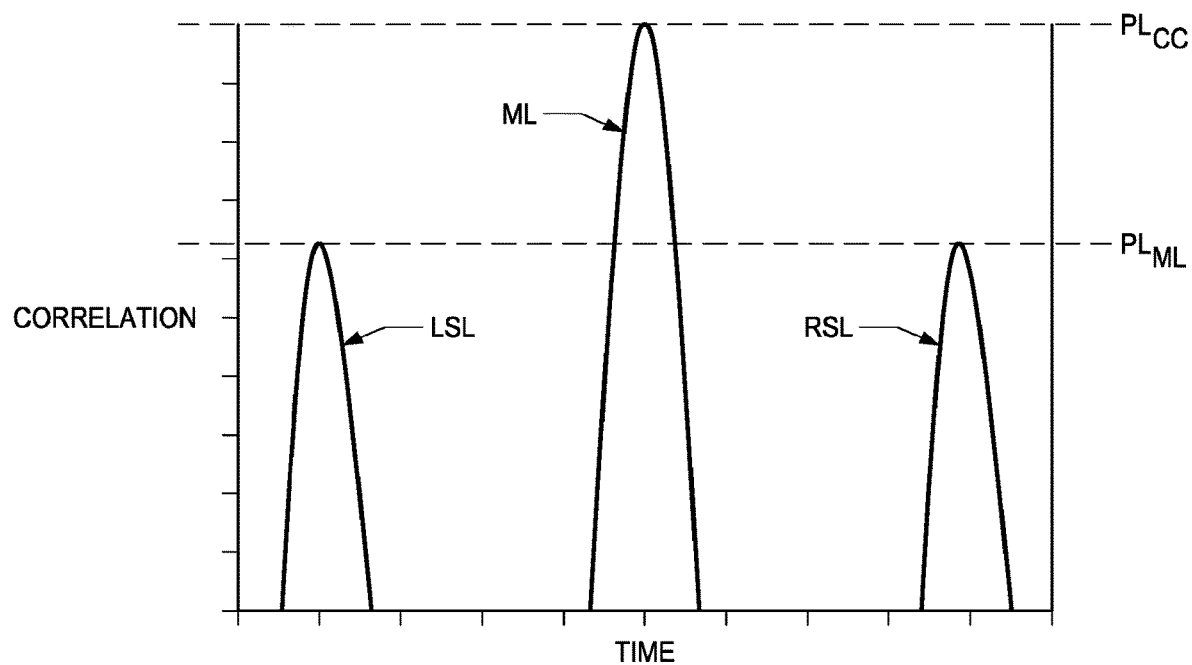
FIG. 11 illustrates a partial plot of three cycles from a correlation of UPS and DNS waveforms.

Further in regard to the preceding, FIG. 11 illustrates a partial plot of three cycles from a correlation of UPS and DNS waveforms as described above, where the illustrated partial plots show a main lobe ML, a left side lobe LSL and a right side lobe RSL. The main lobe ML has a peak at line $PL_{ML}$, which is readily discernable as distinguishably greater than the side lobe peak line $PL_{ML}$ that exists for the side lobes LSL and RSL, whichever is higher. Thus, the preferred embodiment manner of two-tone transducer excitation, one tone immediately following the other, creates a response in the TOF correlation that renders the peak correlation magnitude detectable with less chance of cycle slip, as compared to inadvertently mistaking a side lobe peak as the correlation peak as could occur if a side lobe is close to the amplitude of the center cycle, in which case then the system could confuse the main lobe to be either of the side lobes and thereby causing a cycle slip. Indeed, the ratio between the correlation peak at the main lobe ML and the neighboring peaks to either side (i.e., side lobes LSL and RSL, whichever is greater) can be used as a measure to evaluate the performance of different excitation pulse techniques. Moreover, the ratio also may indicate a benefit in adjusting transmit power so as to improve the ratio, as the ratio provides a measure whether the transmit scheme has provided the needed discernibility in the received signal. The ratio also provides a measure of confidence in the computed TOF. Further in this regard, the following Table 2 depicts in each of its numbers rows an example of excitation of a transducer, where rows 1 and 2 illustrate a prior art single frequency transducer excitation, while rows 3-7 illustrate a preferred embodiment two-tone excitation, at the listed frequency of respective frequencies. The last column, for each row, however, lists the ratio between the magnitudes of the main lobe ML and the largest side lobe magnitude, which is commonly referred to as the peak to side lobe ratio. Note in this regard, therefore, that row 5 of the Table 2 illustrates a relatively large peak variation, particularly as compared to the single tone examples in rows 1 and 2 of the Table. Thus, the preferred embodiments demonstrate ample improvement in correlation detection, thereby improving the related TOF determination.

TABLE 2

| | Input | | Peak to Side Lobe Ratio (dB) Raw signal |
|---|---|---|---|
| Row | Tone | Freq (KHz) | Pulses | (approx. 800 codes) |
| 1 | Single | 160 | 40 | 0.069 |
| 2 | Single | 200 | 40 | 0.097 |
| 3 | Two-Tone | 150, 170 | 20, 20 | 0.382 |
| 4 | Two-Tone | 150, 180 | 20, 20 | 0.705 |
| 5 | Two-Tone | 150, 190 | 20, 20 | 1.270 |
| 6 | Two-Tone | 150, 200 | 20, 20 | 0.999 |
| 7 | Two-Tone | 160, 200 | 20, 20 | 0.996 |

Indeed, each of the two-tone excitations yields an improved result over the single frequency excitation approach, with various degrees of improvement as shown in Rows 3-7 of Table 2. Lastly, while the preceding has been described with respect to delta TOF, note that the same preferred embodiment aspects also may be applied to absolute TOF.

In another aspect of a preferred embodiment, with correlation implemented in determining absolute and differential TOF, a search and track approach is implemented to improve efficiency by reducing the number of correlation operations performed over time. Specifically, returning to the example of FIGS. 9A through 9G, in that approach, wherein each sample set included 440 samples, then a first total of 880 correlation measures are taken, so as to compare the two sets relative to one another at each relative possible time slot combination. This approach is referred to as a search correlation. Once the TOF is so determined (either absolute or differential), however, efficiency is further achieved by reducing the number of time slot positions that are evaluated, for subsequent instances when TOF is later determined for subsequent measures. For example, for such subsequent correlation measure, a second total of only N (e.g., N=30) time slots around the earlier determined peak time may be evaluated, with there being therefore a strong likelihood that the maximum peak will fall within those second total of time slots. Such a reduction, therefore, from 400 time slots to 30 time slots represents a computation reduction of over 90%. This approach is referred to as a track correlation. Thus, the initial search correlation is later followed by the track correlation. Note further that various criteria may be implemented which, if satisfied, returns the correlation methodology back from track correlation (i.e., limited sample slots) to search correlation (i.e., all sample slots in a sample set). For example, if a peak magnitude found using track correlation is sufficiently different (e.g., by some percentage) from the peak magnitude found prior using a search correlation, then the method can revert back to a search correlation. As another example, time may be a criterion, whereby a search correlation is first performed, and thereafter for a period of time all subsequent correlations are track correlations until the time elapses, whereupon again the correlation reverts to a search correlation and so forth for like subsequent time periods.

From the above, the preferred embodiments are shown to provide a transducer system and method using two tone excitation pulse frequencies for such transducers. The preferred embodiment also may use correlation for TOF measures, further enhanced by the use of the two tone transducer excitation. Given the preceding, note that a preferred embodiment method 30 applies an excitation signal to a transducer system across a sweeping range of frequencies and thereby determines a desired two-tone set of excitation frequencies, and later a preferred embodiment method 60 applies the two-tone set of excitation frequencies to a transducer system for a period of operation. In this manner, therefore, method 30 may be repeated at various intervals, based on a change of conditions, where such conditions can be time, environmental (e.g., temperature), or still others. As a result, in response to changes in the field once a system 10 is implemented, the preferred embodiment sweep will determine favorable two tone excitation frequencies that will sufficiently excite the system and produce a measurable and accurate response, so as to adopt to changes in the field, without undue manual testing or the rigidity of a single excitation frequency. Numerous other advantages may arise from the preferred embodiments. For example, the preferred embodiment two tone excitation is useful for system with dual resonance structures. As another example, for a system with a single resonant frequency, even with a relatively narrow bandwidth the preferred embodiment may excite the system with two 3 dB tones, sufficient therefore for excitation around the determined center frequency. As another benefit, even if multiple flowmeters do not have similar frequency responses, two tone excitation works similarly on all the flowmeters, hence benefiting the manufacturer by significantly reducing the calibration time. As still another benefit, two-tone excitation renders the processing algorithm to be more robust across wide range of temperatures. As another example, the preferred embodiments have been empirically shown to provide accurate TOF measures even in noisy environments (i.e., relatively low signal-to-nose ratio (SNR)), with a strong improvement in reducing cycle slips as compared to a single frequency excitation system. Likewise, the preferred embodiments have been empirically shown to provide accurate TOF measures in attenuating media (e.g., methane), also with a strong improvement in reducing cycle slips as compared to a single frequency excitation system. As yet another example, cycle slip issues are also reduced by the preferred embodiment, in response to a bigger correlation peak difference and using the difference in absolute TOF to shift either the upstream or downstream data before computing delta TOF, while the number of correlation computations may be reduced using the search and track aspects of the preferred embodiment, thereby improving the processing demands.

Further, the preferred embodiments have been shown in a favorable implementation with respect to flow meters, but note numerous aspects may apply to other systems. For example, preferred embodiment aspects may be applied to transducer applications other than flow meters. As another example, the preferred embodiment is shown by example in a system with two transducers, but various aspects also may be applied to a single transducer, wherein it is excited with a frequency and transmits a pulse train, after which it then responds to the reflection of that pulse train. In view of the above, therefore, while various alternatives have been provided according to the disclosed embodiments, still others are contemplated and yet others can be ascertained by one skilled in the art. Given the preceding, therefore, one skilled in the art should further appreciate that while some embodiments have been described in detail, various substitutions, modifications or alterations can be made to the descriptions set forth above without departing from the inventive scope, as is defined by the following claims.

What is claimed is:

1. A system, comprising:
a first transducer;
a second transducer; and
a processor communicatively coupled to the first and second transducers, the processor configured to:
determine a peak response frequency based in part on an amplitude of a first echo waveform from the first transducer and an amplitude of a second echo waveform from the second transducer;
determine a first frequency and a second frequency based in part on the determined peak response frequency, wherein the first frequency is at a lower frequency than the peak response frequency and the second frequency is at a higher frequency than the peak response frequency;
apply a two-tone excitation waveform to the first transducer, the excitation waveform comprising a first portion at the first frequency and a second portion at the second frequency;
receive a received echo waveform from the second transducer; and
determine a value indicative of fluid flow velocity based on correlating the received echo waveform to the two-tone excitation waveform.

2. The system of claim 1, wherein the two-tone excitation waveform comprises the first portion then the second portion, or the second portion then the first portion.

3. The system of claim 1, wherein the processor is further configured to:
apply a first set of pulses as the first portion; and
apply a second set of pulses as the second portion.

4. The system of claim 1, wherein the peak response frequency is a maximum amplitude response.

5. The system of claim 4, wherein each of the first frequency and the second frequency corresponds to an amplitude at a predetermined reduced value of the maximum amplitude.

6. The system of claim 4, wherein each of the first frequency and the second frequency corresponds to an amplitude reduced approximately 3 dB from the maximum amplitude.

7. The system of claim 1, wherein the processor is configured to:
determine an absolute time of flight between the applying of the two-tone excitation waveform and the receiving of the received echo waveform.

8. The system of claim 7, wherein the processor is configured to measure a plurality of correlation measures between the two-tone excitation waveform and the received echo waveform.

9. The system of claim 7, wherein the processor is configured to:
measure a first plurality of correlation measures between a first instance of an excitation waveform and a respective first received echo waveform; and
measure a second plurality of correlation measures between a second instance of an excitation waveform and a respective second echo waveform, wherein the second plurality of correlation measures is lesser than the first plurality of correlation measures.

10. The system of claim 7, wherein the processor is configured to:
measure a first plurality of correlation measures between a first instance of a pulse train of the two-tone excitation waveform and a respective first received echo waveform; and
measure a second plurality of correlation measures between a second instance of a pulse train of the two-tone excitation waveform and a respective second received echo waveform, wherein the second plurality of correlation measures is at least 90% lesser than the first plurality of correlation measures.

11. The system of claim 1:
wherein the first transducer is configured to produce a first transmitted signal in response to the two-tone excitation waveform;
wherein the second transducer is configured to produce the received echo waveform in response to the first transmitted signal; and
wherein the processor is configured to determine an absolute time of flight between the applying of the two-tone excitation waveform and the receiving of the received echo waveform.

12. The system of claim 11:
wherein the two-tone excitation waveform comprises a first two-tone excitation waveform and the received echo waveform comprises a first received echo waveform;
wherein the processor is configured to apply a second two-tone excitation waveform comprising the first portion at the first frequency and the second portion at the second frequency to excite the second transducer, wherein the second transducer is configured to produce a second transmitted signal in response to the second two-tone excitation waveform; and
wherein the first transducer is configured to produce a second received echo waveform in response to the second transmitted signal, and the processor is configured to receive the second received echo waveform from the first transducer.

13. The system of claim 12, wherein the processor is configured to determine an absolute time of flight between the applying of the second two-tone excitation waveform and the receiving of the second received echo waveform.

14. The system of claim 13, wherein the processor is configured to determine a relative time of flight based on the first received echo waveform and the second received echo waveform.

15. The system of claim 14, wherein the processor is configured to determine a rate of flow between the first transducer and the second transducer in response to: (i) the absolute time of flight between the applying of the first excitation waveform and the receiving of the first received echo waveform; (ii) the absolute time of flight between the applying of the second excitation waveform and the receiving of the second received echo waveform; and (iii) the relative time of flight based on the first received echo waveform and the second received echo waveform.

16. The system of claim 1, wherein the processor is configured to:
estimate a maximum amplitude response at a corresponding frequency of the first and second transducers;
determine the first frequency lower than the corresponding frequency of the first and second transducers; and
determine the second frequency higher than the corresponding frequency of the first and second transducers.

17. A method, comprising:
determining a peak response frequency based in part on an amplitude of a first echo waveform from a first transducer and an amplitude of a second echo waveform from a second transducer;

determining a first frequency and a second frequency based in part on the determined peak response frequency, wherein the first frequency is at a lower frequency than the peak response frequency and the second frequency is at a higher frequency than the peak response frequency;

applying a two-tone excitation waveform to the first transducer, the excitation waveform comprising a first portion at the first frequency and a second portion at the second frequency;

receiving a received echo waveform from the second transducer; and determining a value indicative of fluid flow velocity based on correlating the received echo waveform to the two-tone excitation waveform.

18. The method of claim 17, wherein: the first portion comprises a first set of pulses; and the second portion comprises a second set of pulses.

19. The method of claim 18, and further comprising:

determining an absolute time of flight between the two-tone excitation waveform and the received echo waveform.

20. The method of claim 19, wherein the two-tone excitation waveform comprises a pulse train, and wherein the correlating the received echo waveform to the two-tone excitation waveform comprises measuring a plurality of correlation measures between the pulse train and the received echo waveform.

21. The method of claim 20 and further comprising adjusting a transmission parameter in response to a peak to side lobe measure.

22. The method of claim 18:

wherein the first transducer produces a first transmitted signal in response to the two-tone excitation waveform;
further comprising:
producing the received echo waveform, at the second transducer, in response to the first transmitted signal; and
determining an absolute time of flight between the applying of the two-tone excitation waveform and the receiving of the received echo waveform.

23. The method of claim 22, wherein the received echo waveform comprises a first received echo waveform, wherein the two-tone excitation waveform comprises a first pulse train having a first set of pulses corresponding to the first portion and a second set of pulses corresponding to the second portion, and further comprising:

applying a second pulse train comprising the first set of pulses and the second set of pulses to excite the second transducer, wherein the second transducer produces a second transmitted signal in response to the second pulse train; and wherein the first transducer produces a second received echo waveform in response to the second transmitted signal.

24. The method of claim 23, further comprising determining an absolute time of flight between the second pulse train and the second received echo waveform.

25. The method of claim 24, further comprising determining a relative time of flight based on the first received echo waveform and the second received echo waveform.

26. The method of claim 17, wherein the peak response frequency is a maximum amplitude response.

27. A system comprising:

a first transducer;

a second transducer;

a first reflector aligned with the first transducer;

a second reflector aligned with the first reflector and the second transducer;

a processor coupled to the first transducer and the second transducer, the processor configured to:

determine a first frequency and a second frequency based on a peak response frequency, wherein the first frequency is at a lower frequency than the peak response frequency and the second frequency is at a higher frequency than the peak response frequency;

apply a two-tone excitation waveform to the first transducer, the excitation waveform comprising a first portion at the first frequency and a second portion at the second frequency; and determine a value indicative of fluid flow velocity based on correlating a received echo waveform to the two-tone excitation waveform from the second transducer.

* * * * *